(12) United States Patent
Watanabe et al.

(10) Patent No.: US 7,804,196 B2
(45) Date of Patent: Sep. 28, 2010

(54) MULTIPLE INPUT/OUTPUT POWER CONVERTER AND FUEL CELL VEHICLE WITH SAME

(75) Inventors: Yasuto Watanabe, Saitama (JP); Mitsuaki Hirakawa, Saitama (JP)

(73) Assignee: Honda Motor Co., Ltd, Tokyo (JP)

( * ) Notice: Subject to any disclaimer, the term of this patent is extended or adjusted under 35 U.S.C. 154(b) by 138 days.

(21) Appl. No.: 11/987,567

(22) Filed: Nov. 30, 2007

(65) Prior Publication Data
US 2008/0136260 A1    Jun. 12, 2008

(30) Foreign Application Priority Data
Dec. 1, 2006    (JP) .............................. 2006-325694

(51) Int. Cl.
*H02J 3/00* (2006.01)
*B60L 3/00* (2006.01)
(52) U.S. Cl. ........................................ 307/82; 307/10.1
(58) Field of Classification Search ................ 307/10.1, 307/82, 18
See application file for complete search history.

(56) References Cited

U.S. PATENT DOCUMENTS 5,875,103 A * 2/1999 Bhagwat et al. ............... 363/17

7,088,065 B2 * 8/2006 Ishikawa et al. ............ 318/376

FOREIGN PATENT DOCUMENTS

| EP | 1562279 A3 | 2/2005 |
|----|------------|--------|
| EP | 1562279 A2 | 10/2005 |
| JP | 2001-204106 A | 7/2001 |
| JP | 2002-118979 A | 4/2002 |
| JP | 2002-118981 A | 4/2002 |
| JP | 2005-224060 A | 8/2005 |
| WO | WO-2006/021115 A1 | 3/2006 |

* cited by examiner

*Primary Examiner*—Michael Rutland Wallis
(74) *Attorney, Agent, or Firm*—Birch, Stewart, Kolasch & Birch, LLP

(57) ABSTRACT

A multiple input/output power converter includes: at least two input/output circuits to be connected to electric units; a plurality of power converting circuits including switches and at least an inductor, a plurality of capacitors connected to the power converting circuits; and a control circuit for controlling the switches in a plurality of modes to selectively operate the inductor and the capacitors to operate the power converting circuits in either of stepping up, stepping down, or conducting operation. The capacitors are shared among the power converting circuits.

18 Claims, 13 Drawing Sheets

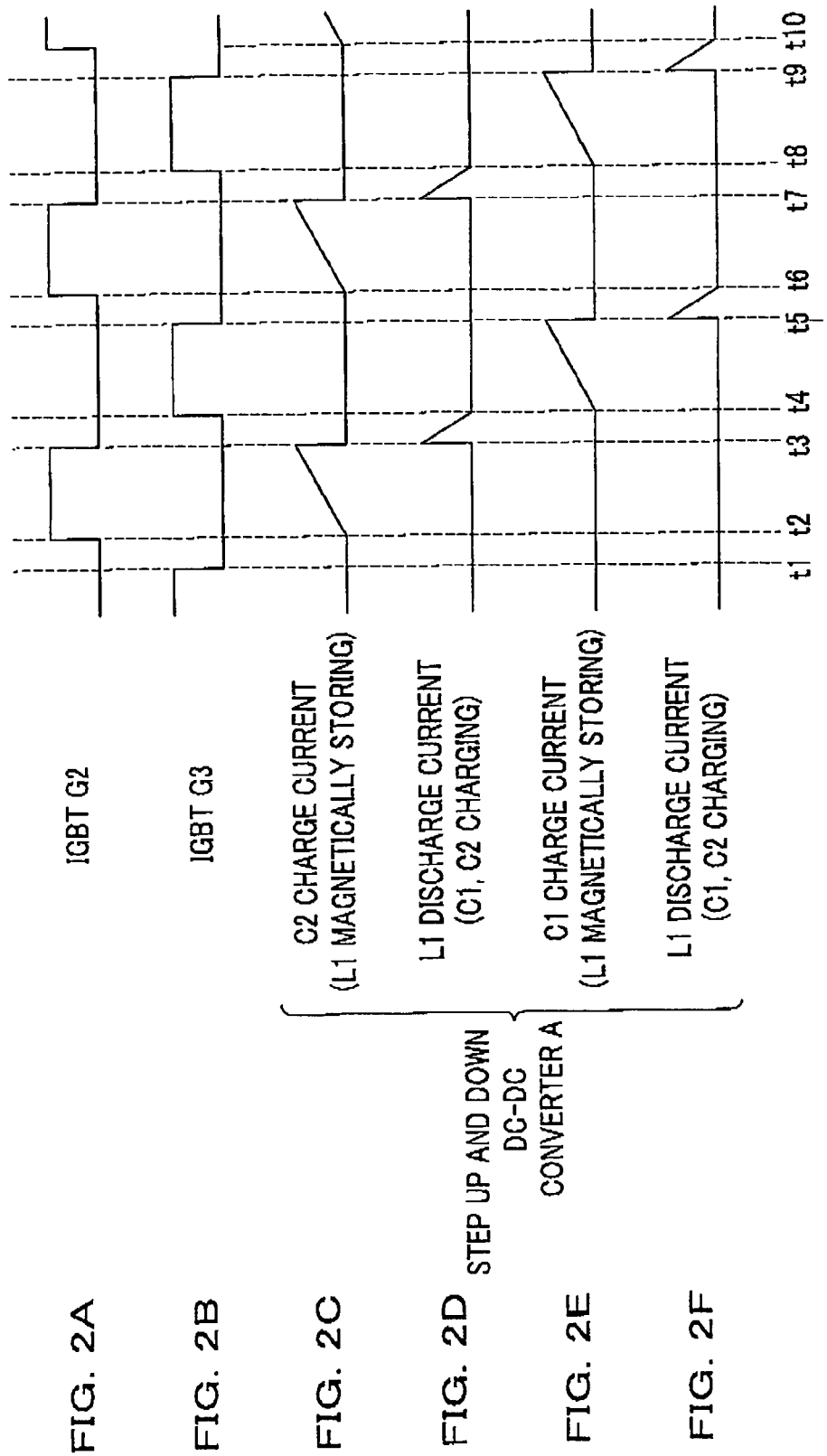

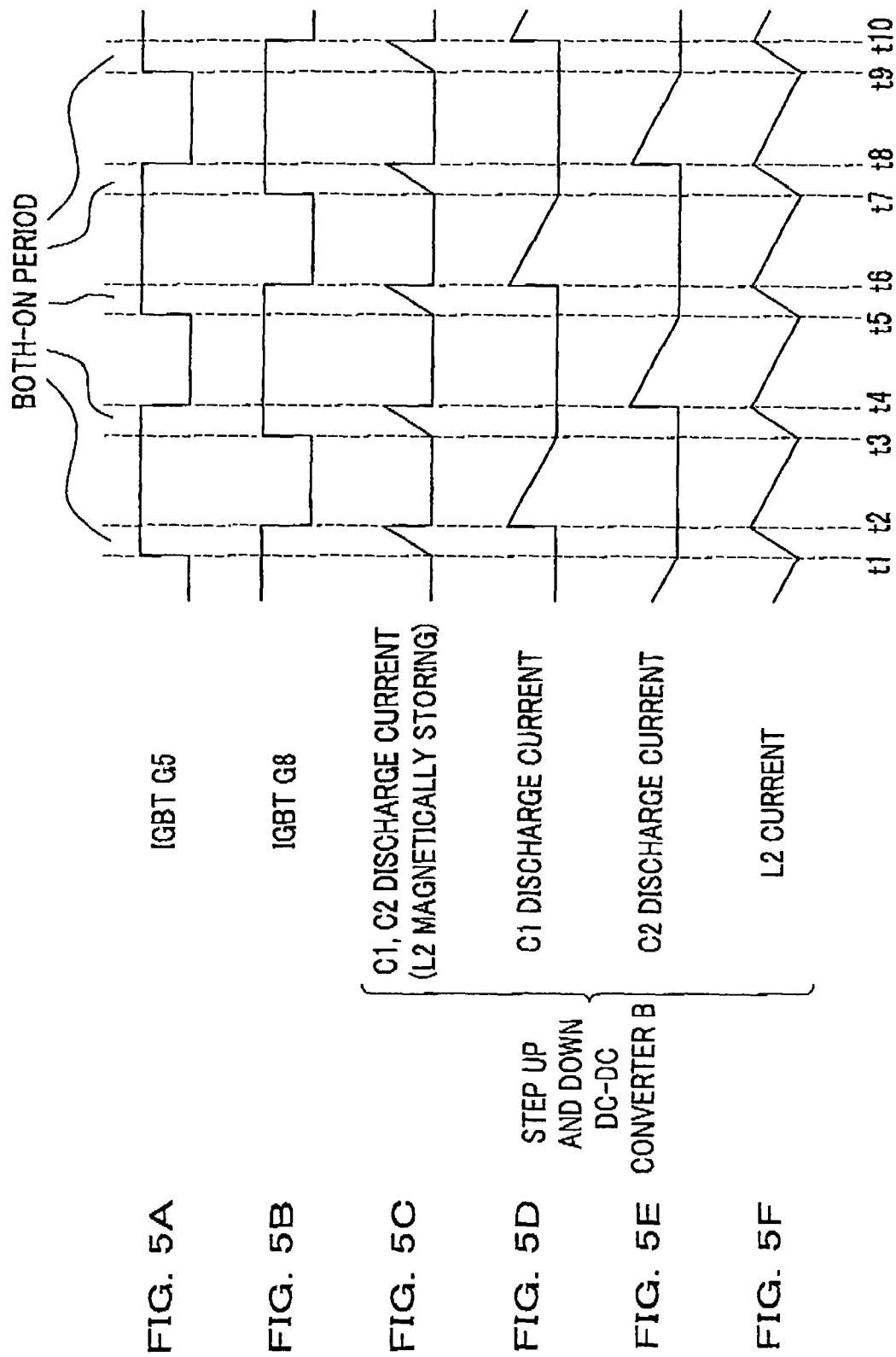

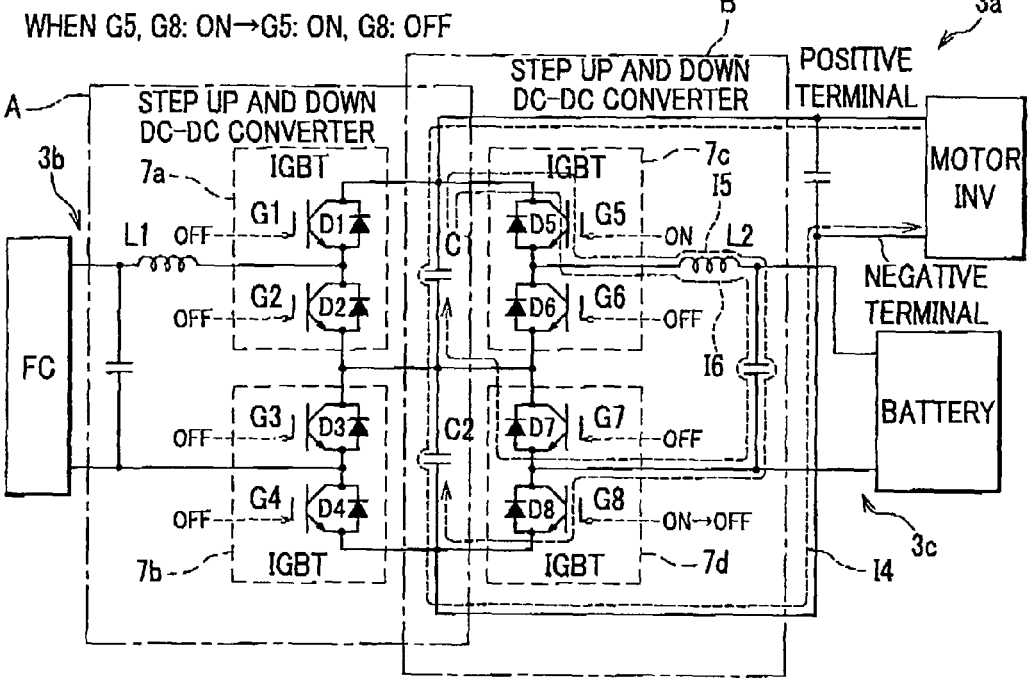
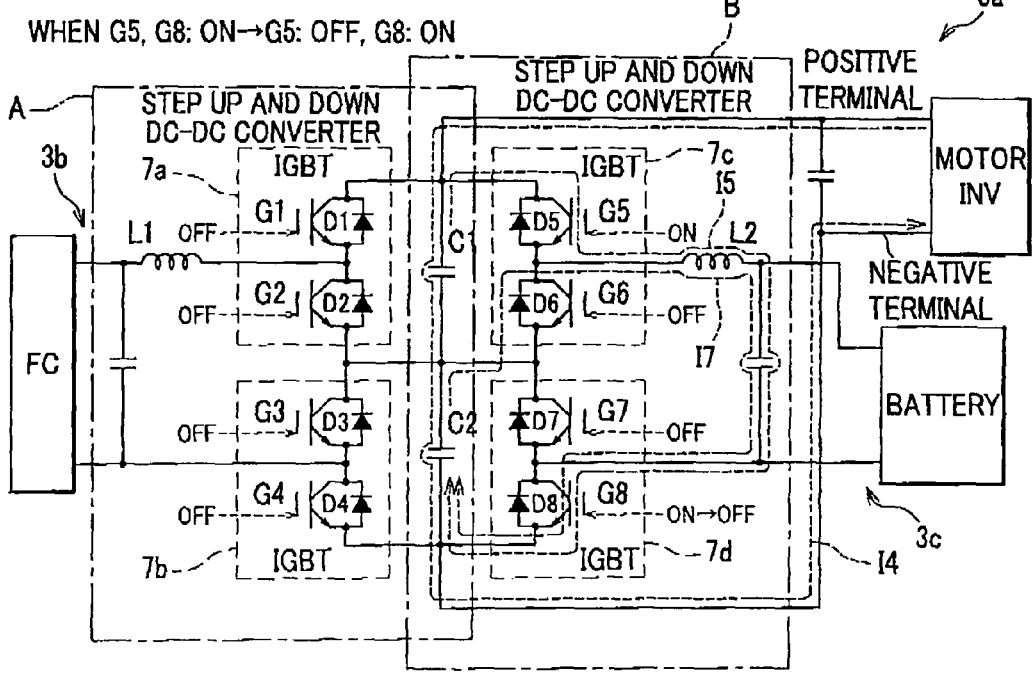

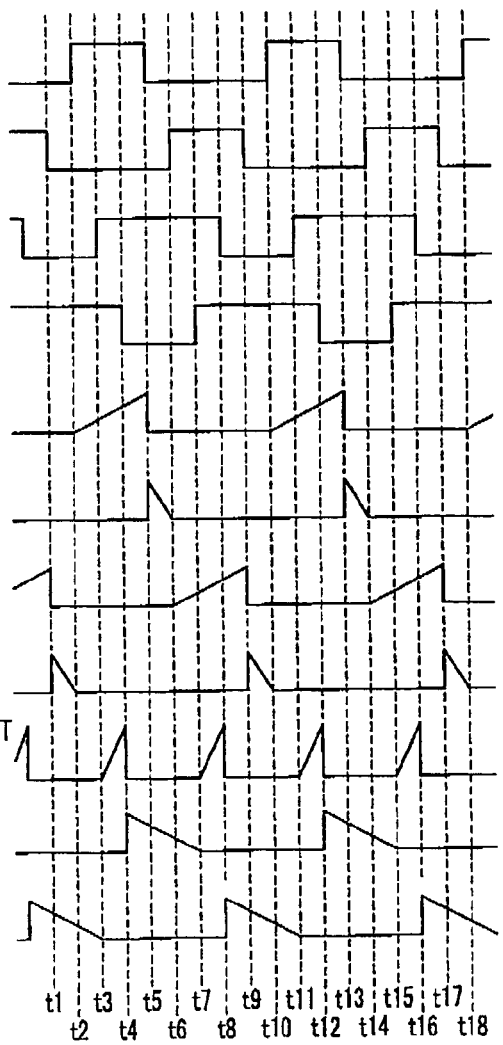

FIG. 8A IGBT G2
FIG. 8B IGBT G3
FIG. 8C IGBT G5
FIG. 8D IGBT G8
FIG. 8E  C2 CHARGE CURRENT (L1 MAGNETICALLY STORING)
FIG. 8F  STEP UP AND DOWN DC-DC CONVERTER A  L1 FLYWHEEL CURRENT (C1, C2 CHARGING)
FIG. 8G  C1 CHARGE CURRENT (L1 MAGNETICALLY STORING)
FIG. 8H  L1 FLYWHEEL CURRENT (C1, C2 CHARGING)
FIG. 8I  C1, C2 DISCHARGE CURRENT (L2 MAGNETICALLY STORING)
FIG. 8J  STEP UP AND DOWN DC-DC CONVERTER B  C1 DISCHARGE CURRENT
FIG. 8K  C2 DISCHARGE CURRENT

WHEN G2: ON→OFF, G3: OFF & G5, G8: ON→G5: ON, G8: OFF

WHEN G2: OFF, G3: ON→OFF & G5, G8: ON→G5: OFF, G8: ON

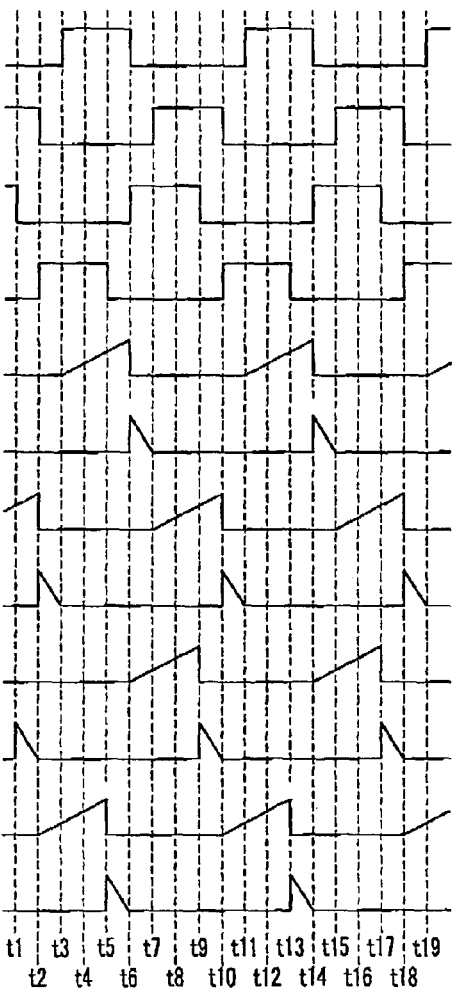

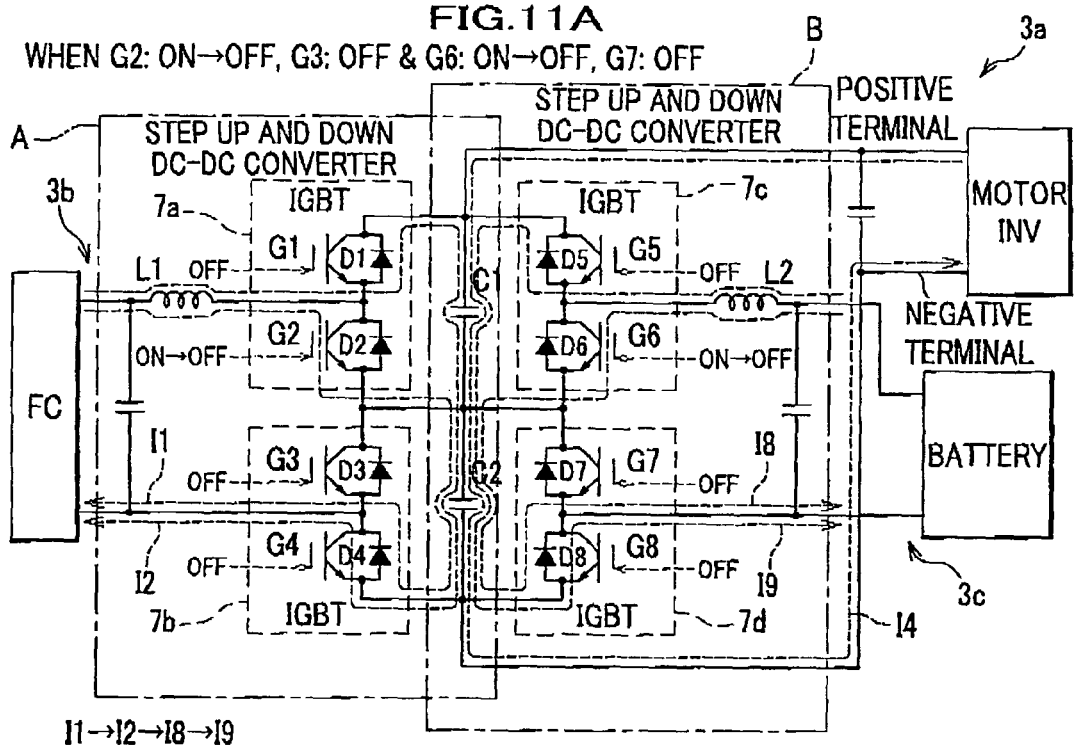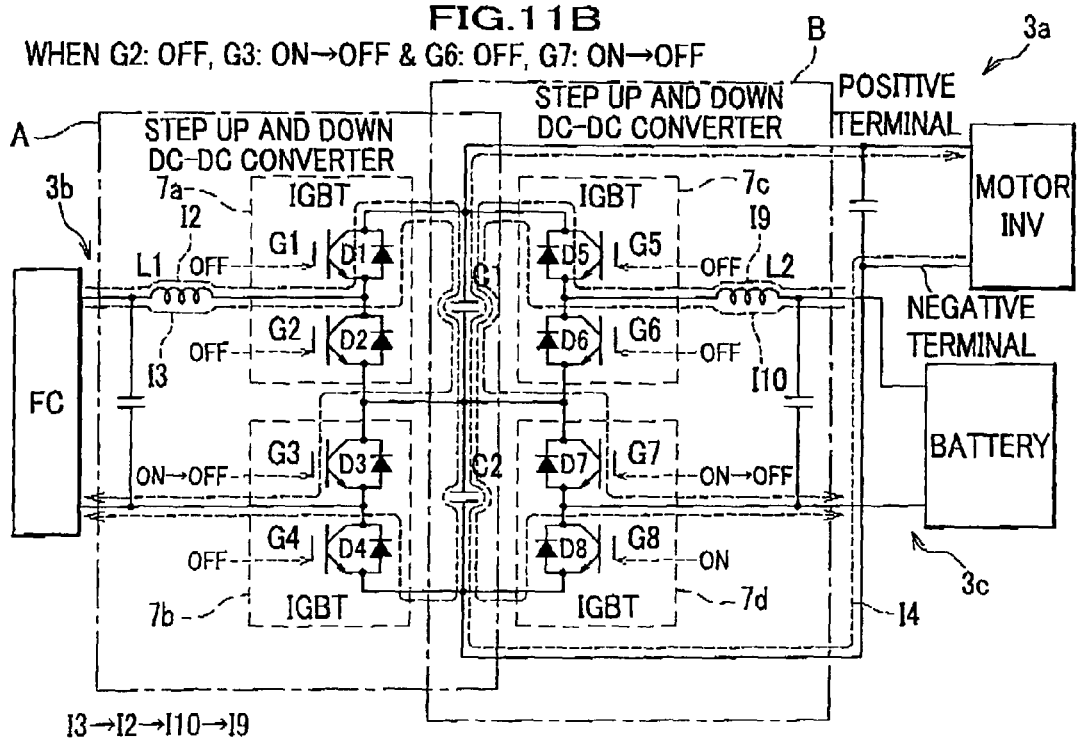

MULTIPLE INPUT/OUTPUT POWER CONVERTER AND FUEL CELL VEHICLE WITH SAME

CROSS REFERENCE TO RELATED APPLICATIONS

This application claims the foreign priority benefit under Title 35, United States Code, §119(a)-(d) of Japanese Patent Application No. 2006-325694, filed on Dec. 1, 2006 in the Japan Patent Office, the disclosure of which is herein incorporated by reference in its entirety.

BACKGROUND OF THE INVENTION

1. Field of the Invention

The present invention relates to a multiple input/output power converter and a fuel cell vehicle with the same.

2. Description of the Related Art

Generally, fuel cell vehicles and hybrid vehicles have a plurality of DC-DC converters to equalize voltages and control discharge and charging operations among a plurality of units such as a fuel cell, a battery, a power drive unit for a motor, a power drive unit for an air pump, and a power drive unit for an air conditioner because these units requires different input and output voltages.

The DC-DC converter converts an input voltage into an output having a desired voltage using a power storage function with a capacitor and the like. If the larger power (high voltage with large current) is required, the larger capacity of the capacitor is required. Thus the size of the capacitor becomes large, which increases a weight of the DC-DC converter and a required space. In addition, this also increases the production cost.

JP 2005-224060A, JP 2002-118981A, JP 2002-118979A, and JP 2001-204106A disclose power converting systems with various types of connection between units.

SUMMARY OF THE INVENTION

A first aspect of the present invention provides a multiple input/output power converter comprising: at least two input/output circuits to be connected to electric units; a plurality of power converting circuits including switches and at least an inductor; a plurality of capacitors connected to the power converting circuits; and a control circuit for controlling switching of the switches in a plurality of operation modes to selectively use the inductor and the capacitors to operate the power converting circuits in either of a voltage stepping up operation, a voltage stepping down operation, or a conducting operation, wherein the capacitors are shared among the power converting circuits.

In this multiple input/output power converter, preferably, the capacitors are shared by a plurality of power converters, wherein the capacitors are charged and discharged by switching. Preferably, at least one of the power converters performs either of stepping up, stepping down, conducing, and regeneration in accordance with the operation mode. The operation modes are provided for setting the multiple input/output power converter to step up or down an output voltage of at least one of the input/output circuits. In the switching of the power converters, on-durations may overlap with each other, i.e., the on-durations may be simultaneous at least partially. This may provide a stepping up operation with more than twice stepping up rate or a continuous output current even in the stepping down operation with a high stepping down rate (from 0.5 to 1.0).

A second aspect of the present invention based on the first aspect provides a multiple input/output power converter, wherein at least one of the power converting circuits comprises a step up and down converting circuit; the input/output circuits comprise first and second input/output circuits; the capacitors comprise first and second capacitors connected in series; the switches comprise: a first switch for selectively connecting a positive terminal of the first input/output circuit to a positive terminal of the first capacitor and a positive terminal of the second input/output circuit; a second switch for selectively connecting the positive terminal of the first input/output circuit to a negative terminal of the first capacitor and a positive terminal of the second capacitor; a third switch for selectively connecting a negative terminal of the first input/output circuit to the negative terminal of the first capacitor and the positive terminal of the second capacitor; and a fourth switch for selectively connecting the negative terminal of the first input/output circuit to a negative terminal of the second capacitor and the negative terminal of the second input/output circuit.

Preferably, in the multiple input/output power converter based on the second aspect, at least one of a plurality of the power converters comprises a stepping up and down circuit (bi-directional stepping up and down circuit), wherein charging and discharging the first and second capacitors are performed with the first to fourth switches. The stepping up and down circuit may perform either of a stepping up operation, a conducting operation, or a regenerating (stepping down) operation.

A third aspect of the present invention based on the first aspect provides a multiple input/output power converter, wherein at least one of the power converting circuits comprises a step up circuit; the input/output circuits comprise a first input/output circuit and a second input/output circuit; the capacitors comprise first and second capacitors connected in series; and the switches comprise a first switch for selectively connecting a positive terminal of the first input/output circuit to a negative terminal of the first capacitor and a positive terminal of the second capacitor and a second switch for selectively connecting a negative terminal of the first input/output circuit to the negative terminal of the first capacitor and the positive terminal of the second capacitor.

In this structure, preferably, the power converter in the multiple input/output power converter is a stepping up circuit in which first and second switches charge and discharge the first and second capacitors, wherein the stepping up circuit performs either of a voltage stepping up or a conducting operation.

A fourth aspect of the present invention based on the first aspect provides a multiple input/output power converter, wherein at least one of the power converting circuits comprises a stepping down circuit; the input/output circuits comprise first and second input/output circuits; the capacitors comprise first and second capacitors connected in series; and the switches comprise: a first switch for selectively connecting a positive terminal of the first input/output circuit to a positive terminal of the first capacitor, and a positive terminal of the second input/output circuit; and a second switch for selectively connecting a negative terminal of the first input/output circuit to a negative terminal of the second capacitor and a negative terminal of the second input/output circuit.

In this structure, preferably, the power converter in the multiple input/output power converter is a stepping down circuit in which first and second switches charges and discharges the first and second capacitors, wherein the stepping down circuit performs either of the conducing or regeneration (stepping down) operations.

A fifth aspect of the present invention based on the first aspect provides a multiple input/output power converter, wherein at least one of the power converting circuits is directly connected to the capacitors in parallel.

In this structure, preferably, at least one of the input/output circuits is directly connected to the capacitors in parallel. Thus a load requiring frequent power transmission is connected to the input/output circuit through a route including only one other power converter.

A sixth aspect of the present invention based on the first aspect provides a multiple input/output power converter, wherein the control circuit controls the switches to operate the power converting circuits at different switching timing, respectively.

In this structure, preferably, the control circuit controls the switches to operate the power converters at different switching timing, respectively. This may decrease a conversion loss.

A seventh aspect of the present invention provides a fuel cell vehicle comprises; a fuel cell; a motor: and a multiple input/output power converting circuit, connected to the fuel cell and the motor, comprising: at least two input/output circuits to be connected to electric units; a plurality of power converting circuits including switches and at least an inductor; a plurality of capacitors connected to the power converting circuits; and a control circuit for controlling switching of the switches in a plurality of operation modes to selectively use the inductor and the capacitors to operate the power converting circuits in either of a voltage stepping up operation, a voltage stepping down operation, or a conducting operation, wherein the capacitors are shared among the power converting circuits.

In the fuel cell vehicle, preferably, power transmission of the drive power from the fuel cell to the motor the motor and power transmission form the battery to the motor and from the motor to the battery is frequent. Thus, power transmission between the motor and other unit can be performed with a route including only one power converter. This may decrease a power conversion loss.

BRIEF DESCRIPTION OF THE DRAWINGS

The object and features of the present invention will become more readily apparent from the following detailed description taken in conjunction with the accompanying drawings in which:

FIGS. 2A to 2F show voltage and current waveforms in the multiple input/output power converter shown in FIG. 1 in a stepping up operation;

FIGS. 5A to 5F show voltage and current waveforms in the multiple input/output power converter shown in FIG. 1 in a stepping down operation;

FIGS. 6A and 6B show currents flowing in the multiple input/output power converter shown in FIG. 1 in the stepping down operation;

FIGS. 8A to 8K show voltage and current waveforms in the multiple input/output power converter shown in FIG. 1 in a stepping up and down operation;

FIGS. 10A to 10L show voltage and current waveforms in the multiple input/output power converter shown in FIG. 1 to operate two DC-DC power converters in stepping up operations;

FIGS. 11A and 11B show currents flowing in the multiple input/output power converter shown in FIG. 1 to operate two DC-DC power converters in stepping up operations;

The same or corresponding elements or parts are designated with like references throughout the drawings.

DETAILED DESCRIPTION OF THE INVENTION

Prior to describing an embodiment of the present invention, the above-mentioned related art will be further argued.

In technologies disclosed in JP 2005-224060A, JP 2002-118981A, JP 2002-118979A, and JP 2001-204106A, miniaturization of the power converting systems is insufficient.

The present invention can provide a multiple input/output power converter with a further small size and a further light weight.

More specifically, the present invention provides a power converter with a small size and a light weight in which capacitors are shared by a plurality of input/output parts by charging and discharging the capacitors through switching of which switching mode is changed in accordance with an operation mode. In addition, the present invention provides a fuel cell vehicle in which the power converting system is miniaturized with low conversion loss using the power converter according to the present invention in which the capacitors are shared among a plurality of units.

With reference to drawings will be described an embodiment of the present invention.

Figure 13:
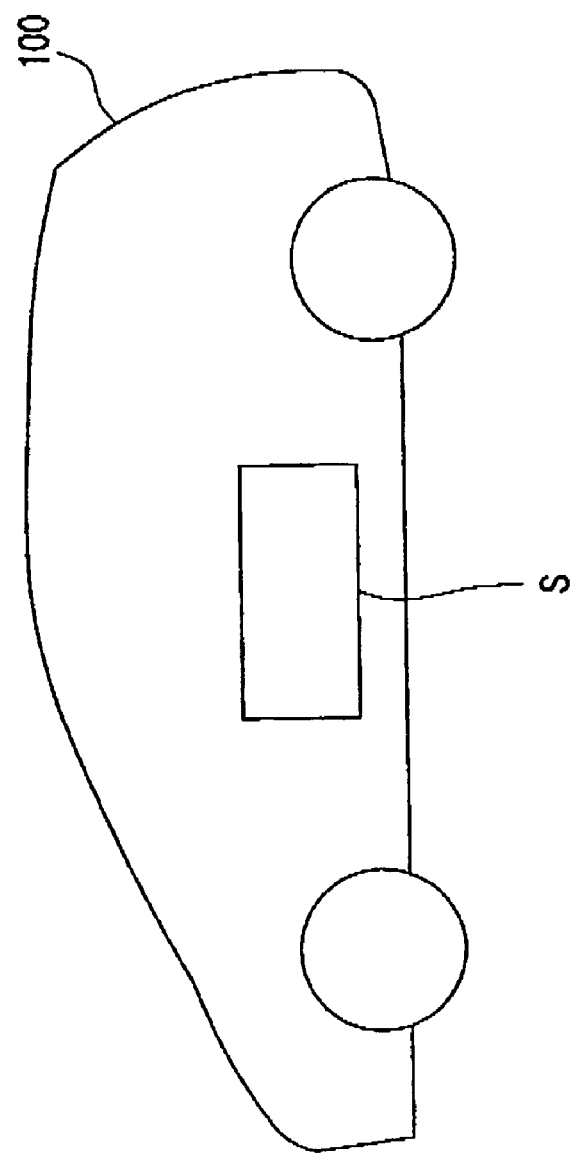
FIG. 13 is an illustration of a fuel cell vehicle including a multiple input/output power converting system according to the present invention.

FIG. 13 shows a fuel cell vehicle 100 including a multiple input/output power converting system S according to the present invention.

<Structure of Multiple Input/Output Power Converting System>

Figure 1:
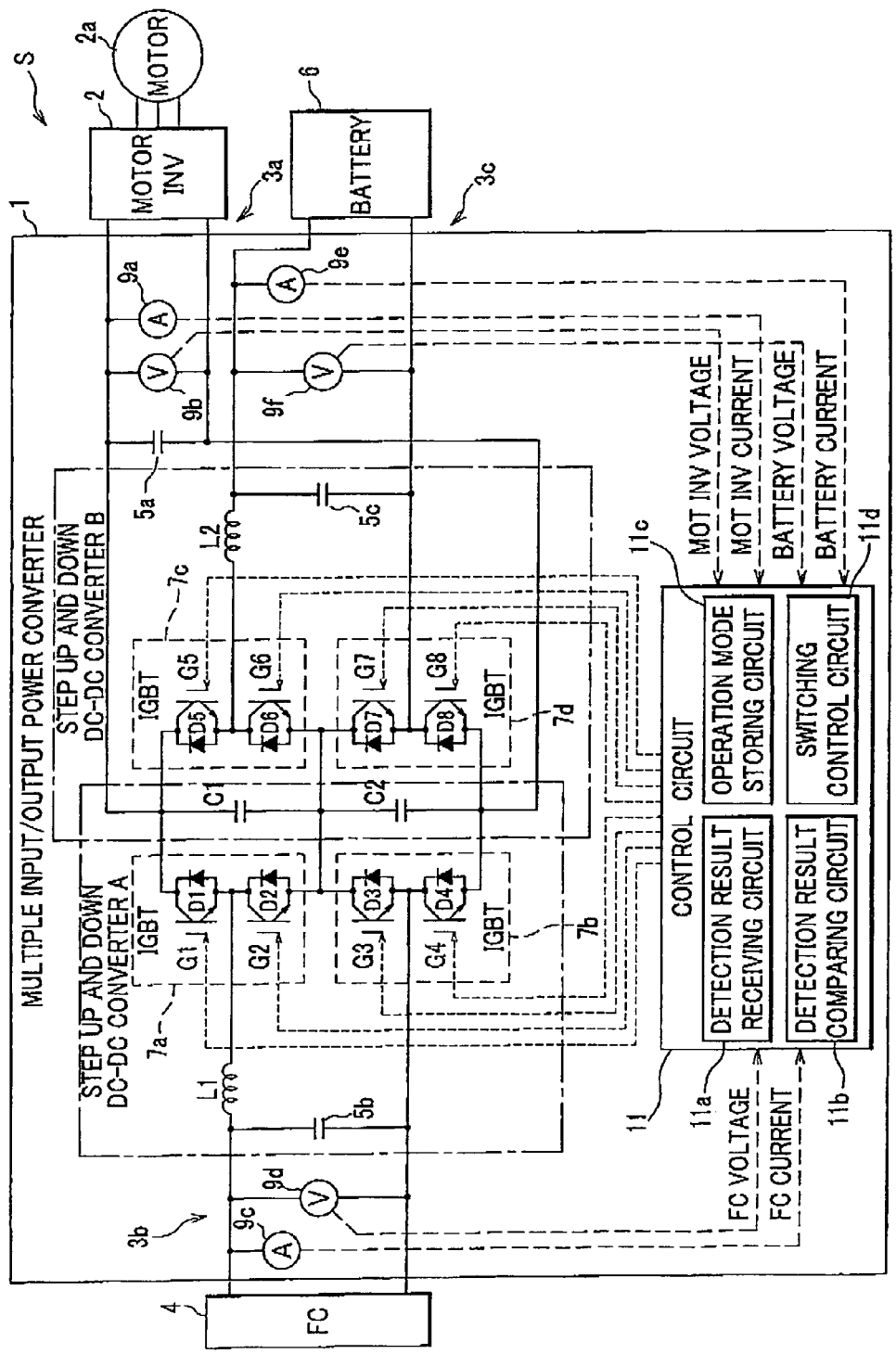
FIG. 1 is a schematic circuit diagram of a multiple input/output power converting system including a multiple input/output power converter according to an exemplary embodiment of the present invention.

FIG. 1 shows a circuit diagram of a multiple input/output power converting system S including a multiple input/output power converter 1 according to the embodiment of the present invention. As shown in FIG. 1, the multiple input/output power converting system S includes a multiple input/output power converter 1, a motor inverter 2, a fuel cell 4, and a battery 6 in which the motor inverter (INV) 2, the fuel cell (FC) 4, and the battery 6 are connected to the multiple input/output power converter 1. Prior to describing the multiple input/output power converter 1, the motor inverter 2, the fuel cell 4, and the battery 6 will be described.

The motor inverter 2 is connected to the motor 2a to supply a drive power to the motor 2a. The fuel cell 4 is provided to be mounted on a vehicle, wherein the output voltage of the fuel cell is stepped up to different voltages between high and low speed traveling in accordance with an operation mode of the multiple input/output power converter 1. The battery 6 is a secondary battery to be mounted on a vehicle for supplying a power of DC 12 V.

The multiple input/output power converter 1 selectively performs stepping up and stepping down of voltages from the fuel cell 4 to the battery 6, from the battery 6 to the fuel cell 4, from the fuel cell 4 to the motor inverter 2, from the battery 6 to the motor inverter 2, and from the motor inverter 2 to the battery 6. In the stepping up operation, an input voltage is stepped up to an output voltage which is once to twice or more the input voltage. In the stepping down operation, an input voltage is stepped down to an output voltage which is zero to once the input voltage.

The multiple input/output power converter 1 includes input/output circuits 3a to 3c, smoothing capacitors 5a to 5c, a coil (inductor) L1 connected to the fuel cell 4, and a coil L2 connected to the battery 6. The input/output circuit 3a is connected to the motor inverter 2 a. The input/output circuit 3c connected to the battery 6. The smoothing capacitor 5a is connected in parallel to the motor inverter 2. The smoothing capacitor 5b is connected in parallel to the fuel cell 4. The smoothing capacitor 5c is connected in parallel to the battery 6.

The multiple input/output power converter 1 is not a power converter simply combining a plurality of single DC-DC converters, but includes a plurality of power converters which mutually cooperate during stepping up and down operations for loads connected to the input/output circuit 3. Thus, these power converters are a united circuit and cannot be separated.

The multiple input/output power converter 1 includes capacitors C1 and C2 connected in series which are shared therein and four IGBT circuits 7a, 7b, 7c, and 7d.

The multiple input/output power converter 1 further includes a current meter (current measuring unit) 9a for measuring a current flowing through the input/output circuit 3a, a voltage meter (voltage measuring unit) 9b for measuring a voltage at the input/output circuit 3a, a current meter 9c for measuring a current flowing through the input/output circuit 3b, a voltage meter 9d for measuring a voltage at the input/output circuit 3b, a current meter 9e for measuring a current flowing through the input/output circuit 3c, a voltage meter 9f for measuring a voltage at the input/output circuit 3c, and a control circuit 11. Here, the current meters 9a, 9c, and 9e and voltage meters 9b, 9d, and 9f are also referred to as detecting units 9a to 9f.

The input/output circuits 3a to 3c each have a positive terminal for receiving an input voltage and supplying an output voltage (also referred to as a positive terminal side) and a negative terminal (also referred to as a negative terminal side).

The smoothing capacitors 5a to 5c are provided to decrease an impedance of a power supply for supplying an input voltage to the input/output circuits 3a to 3c and to stabilize stepping up, regenerating, and conducting operations for the output voltage of the input/output circuits 3a to 3c. In the embodiment, the smoothing capacitors 5a to 5c comprise chemical capacitors, but may comprise film capacitors.

The coils L1 and L2 are connected to positive terminal sides (and/or negative terminals) of the input/output circuit 3b and 3c, respectively and conduct and store magnetic energy from currents flowing from the input/output circuits 3b and 3c and supply flywheel current to the capacitors C1 and C2 by switching of the IGBT circuits 7a to 7d.

The capacitors C1 and C2 are shared among the input/output circuits 3a to 3c and store and discharge charges (current and flywheel currents). Discharging the charges in the capacitors C1 and C2 toward the input/output circuits 3a to 3c steps up the input voltages.

The IGBT circuits 7a to 7d are transistor switches each including a pair of IGBT elements (switches G1 to G8) and flywheel diodes D1 to D8 (which may be included in the IGBT element) to repeat switching (turning ON and OFF) in accordance with the operation mode. The IGBT circuits 7a to 7d each include a pair of switches and two flywheel diodes. The IGBT circuit 7a includes the switches G1 and G2 and flywheel diodes D1 and D2. The IGBT circuit 7b includes the switches G3 and G4 and flywheel diodes D3 and D4. The IGBT circuit 7c includes the switches G5 and G6 and flywheel diodes D5 and D6. The IGBT circuit 7d includes the switches G7 and G8 and flywheel diodes D7 and 98. In the embodiment, the transistor switches comprise IGBT elements, but are not limited to those.

The switch G1 is provided in a line connecting the coil L1 on the positive terminal side of the input/output circuit 3b to the positive terminal side of the capacitor C1 and turns on and off (electrically connects and disconnects) this line.

The switch G2 is provided in a line connecting the coil L1 on the positive terminal side of the input/output circuit 3b to the negative terminal side of the capacitor C1 and the positive terminal side of the capacitor C2 and turns on and off (electrically connects and disconnects) this line.

The switch G3 is provided in a line connecting the negative terminal side of the input/output circuit 3b to the negative terminal side of the capacitor C1 and the positive terminal side of the capacitor C2 and turns on and off (electrically connects and disconnects) this line.

The switch G4 is provided in a line connecting the negative terminal side of the input/output circuit 3b to the negative terminal side of the capacitor C2 and turns on and off (electrically connects and disconnects) this line.

The switch G5 is provided in a line connecting the coil L2 on the positive terminal side of the input/output circuit 3c to the positive terminal side of the capacitor C1 and turns on and off (electrically connects and disconnects) this line.

The switch G6 is provided in a line connecting the coil L2 on the positive terminal side of the input/output circuit 3c to the negative terminal side of the capacitor C1 and the positive terminal side of the capacitor C2 and turns on and off (electrically connects and disconnects) this line.

The switch G7 is provided in a line connecting the negative terminal side of the input/output circuit 3c to the negative terminal side of the capacitor C1 and the positive terminal side of the capacitor C2 and turns on and off (electrically connects and disconnects) this line.

The switch G8 is provided in a line connecting the negative terminal side of the input/output circuit 3c to the negative terminal side of the capacitor C2 and turns on and off (electrically connects and disconnects) this line.

Here, the input/output circuit 3b connected to the fuel cell 4, the coil L1, the capacitor 5b, the IGBT circuit 7a (switches G1 and G2), the IGBT circuit 7b (switches G3 and G4), the capacitors C1 and C2 form a power converting circuit which is referred to as a step up and down DC-DC converter A. The input/output circuit 3c connected to the battery 6, the coil L2, the capacitor 5c, IGBT circuit 7c (switches G5 and G6), the IGBT circuit 7d (switches G7 and G8), and the capacitors C1 and C2 form a power converting circuit which is referred to as a step up and down DC-DC converter B.

The detecting units 9a to 9f detect intensities of currents and voltages in the input/output circuits 3a to 3c. The intensities of the currents and voltages (detection results) detected by the detecting units 9a to 9f are applied to the control circuit 11.

The control circuit 11 controls operations in the multiple input/output power converter 1 and includes a detection result receiving circuit 11a, a detection result comparing circuit 11b, an operation mode storing circuit 11c, and switching control circuit 11d.

The detection result receiving circuit 11a receives the intensities of the currents and voltages detected by the detecting units 9a to 9f (detection results). The detection results includes a motor current intensity, a motor voltage intensity, a fuel cell current intensity, a fuel cell voltage intensity, a battery current intensity, and a battery voltage intensity.

The detection result comparing circuit 11b compares the detection results (between voltage intensities and between current intensities) received by the detection result receiving unit 11a and supplies comparison results to the switching control circuit 11d.

The operation mode storing circuit 11c stores predetermined operation modes (switching patterns) and comprises a general memory.

The switching control circuit 11d reads out one of the operation modes (operation patterns) stored in the operation mode storing circuit 11c and conducts the switching operation of the IGBT circuits 7 in accordance with the operation mode.

The multiple input/output power converter 1 performs the switching operation of the IGBT circuits 7a to 7d (the switches G1 to G8) in accordance with the operation mode with the switching control circuit 11d. The switching provides charging and discharging the capacitors C1 and C2 to output stepped-up voltages, wherein the capacitors C1 and C2 are shared by a plurality of the input/output circuits 3a to 3c. This contributes reducing size and weight.

The multiple input/output power converter 1 can detect intensities of voltages and currents in the input/output circuits 3a to 3c with the detecting units 9a to 9f and controls the stepping up and down operation on the basis of the detected voltages and currents.

With reference to FIGS. 2A to 11 will be described an operation of the multiple input/output power converter 1. The multiple input/output power converter 1 performs the stepping up operation, a regeneration (stepping down) operation, and a conducting operation by the switching of the switches G1 to G8 in the IGBT circuits 7a to 7d. In this case, the step up and down DC-DC converters A and B serve as voltage stepping up circuits and voltage stepping down circuits. Will be described four patterns (patterns 1 to 4) of the operation of the multiple input/output power converter 1.

<Operation I>

Stepping Up Fuel Cell Voltage (Battery Voltage)

Will be described the operation of stepping up the voltage of the fuel cell FC (fuel cell voltage) to a voltage to be supplied to the motor inverter 2.

In the operation of stepping up the fuel cell voltage to the voltage to be supplied to the motor inverter 2, the switches G1 in the IGBT circuit 7a and the switch G4 in the IGBT circuit 7b, the IGBT circuits 7c and 7d are always turned off.

Figure 3A:
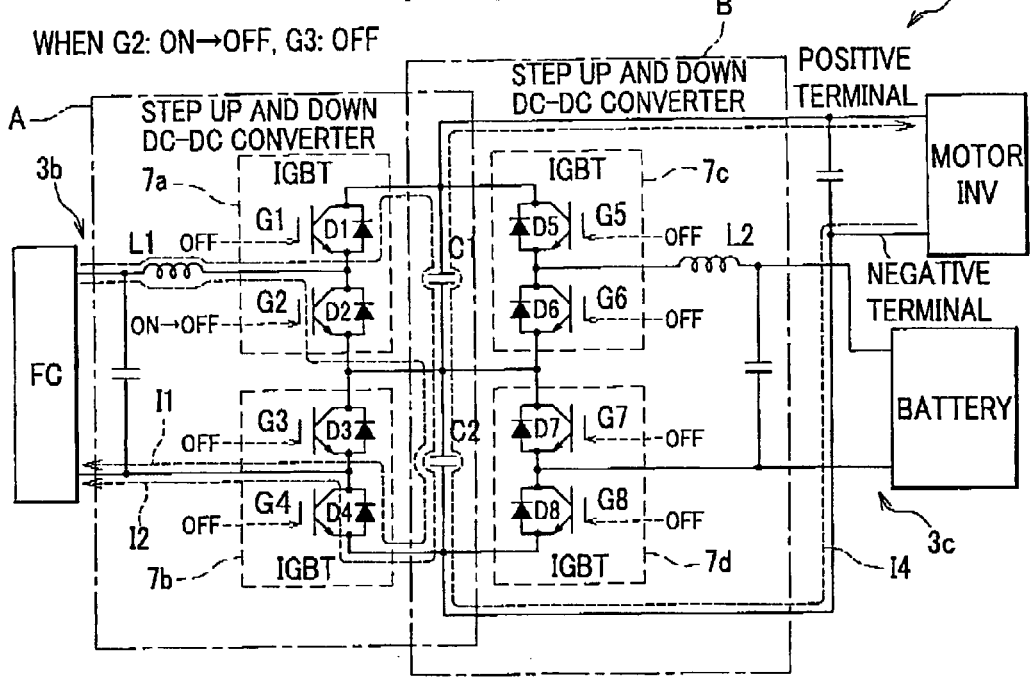
FIGS. 3A and 3B show currents flowing in the multiple input/output power converter shown in FIG. 1 in the stepping up operation.
Figure 3B:
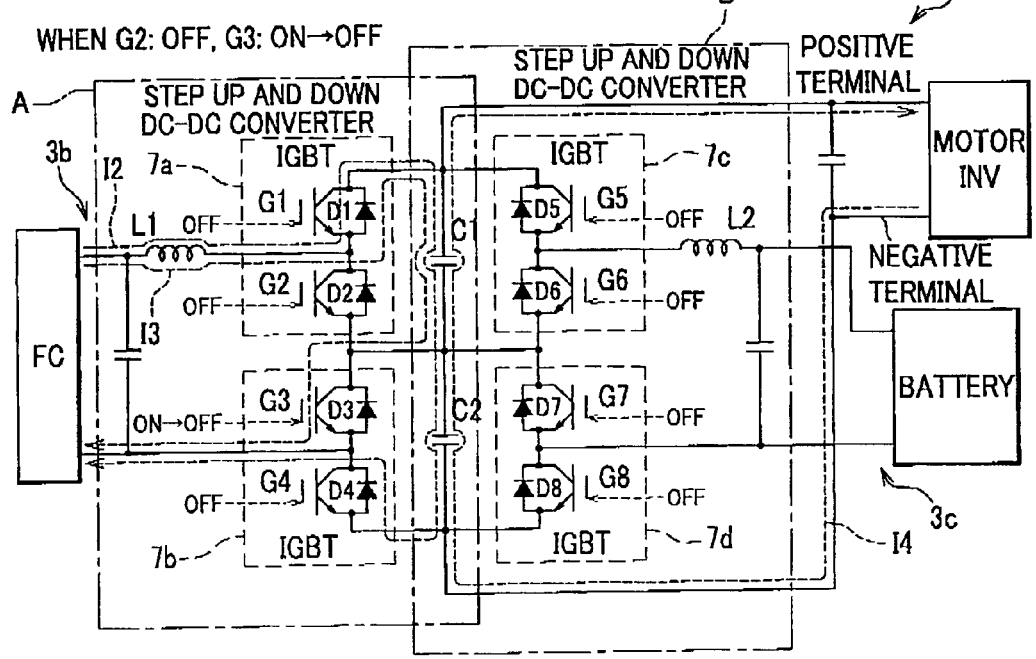
Figure 4A:
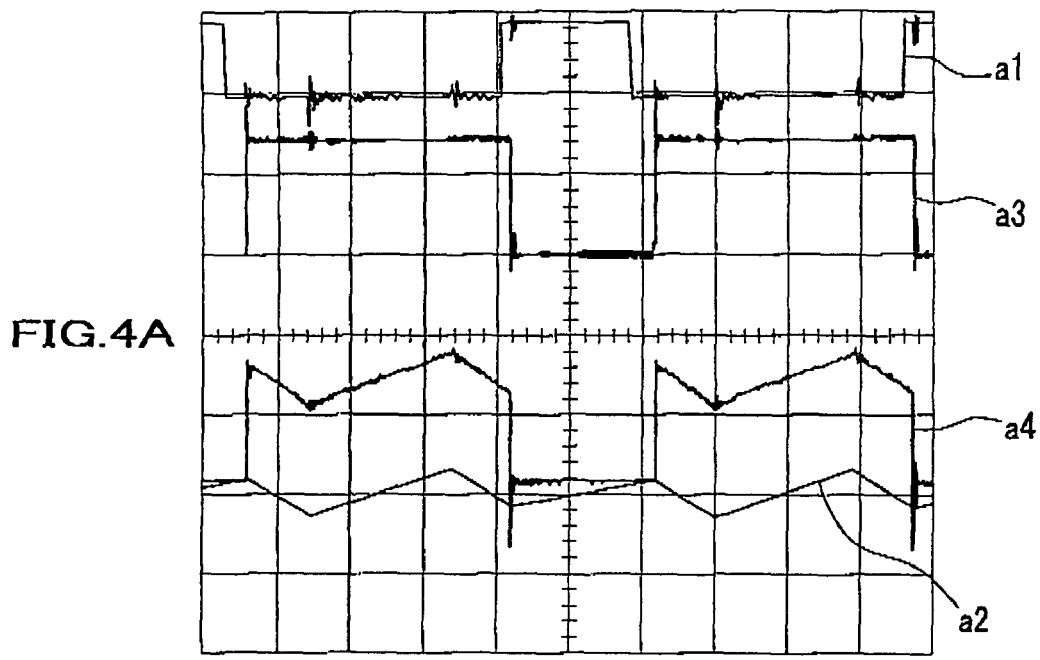
FIGS. 4A and 4B show measured waveforms and measured locations in the stepping up operation of the multiple input/output power converter shown in FIG. 1.
Figure 4B:
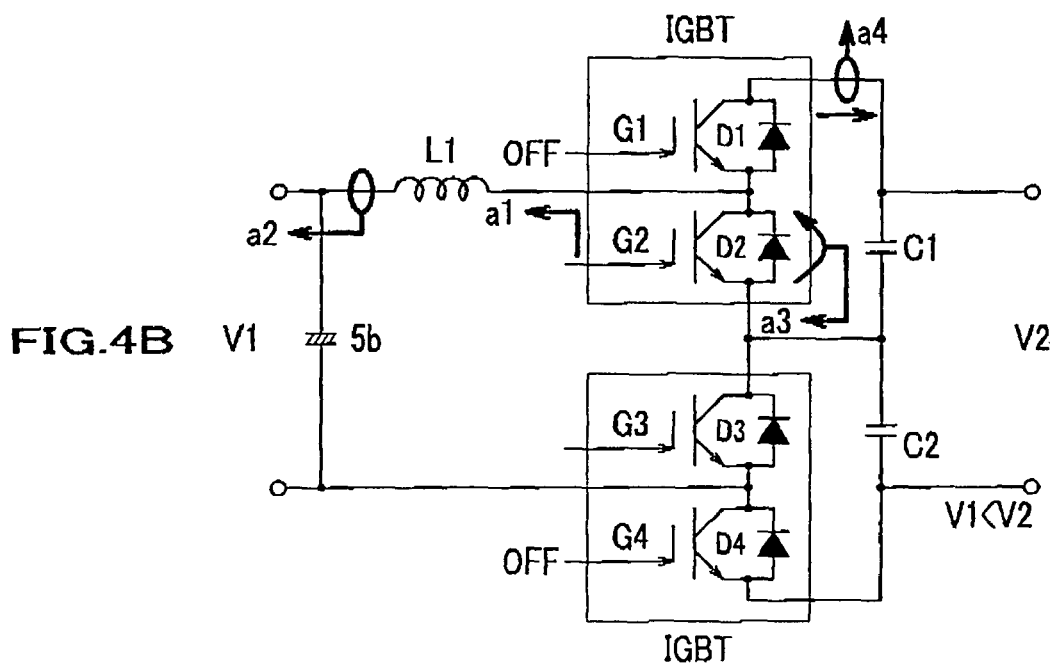

FIGS. 2A to 2F show gate voltage waveforms at the switch G2 of the IGBT circuit 7a and the switch G3 of the IGBT circuit 7b and current waveforms at the capacitors C1 and C2, and the coil L1. FIG. 3A shows in the circuit diagram currents flowing when the switch G2 turns off in a status of the switch G3 in an off-state. FIG. 3B shows in the circuit diagram currents when the switch G3 turns off in a status of the switch G2 in an off-state. FIG. 4A shows measured waveforms of currents and voltages in the multiple input/output converter 1. FIG. 4B shows locations where the waveforms of currents and voltages shown in FIG. 4A are measured.

As shown in FIGS. 2A to 2F, one cycle of the gate voltage waveform of the switch G2 of the IGBT circuit 7a is from timing t2 to timing t6, and one cycle of the gate voltage waveform of the switch G3 of the IGBT circuit 7b is from timing t4 to timing t8.

From when the switch G2 of the IGBT circuit 7a switches turns on to when the switch C2 turns off (timing t2 to timing t3, timing t6 to timing t7), a charge current flowing into the capacitor C2 of the step up and down DC-DC converter A is observed.

During this operation, a magnetic energy is stored in the coil L1. The magnetic energy is released from the coil L1 from when the switch G2 of the IGBT circuit 7a turns off to when the switch G3 of the IGBT circuit 7b turns on (timing t3 to timing t4, timing t7 to timing t8), which charges the capacitors C1 and C2.

A charge current flowing into the capacitor C1 of the step up and down DC-DC converter A is observed from when the switch G3 of the IGBT circuit 7b turns on to when the switch G3 turns off (timing t4 to timing t5, timing t8 to timing t9). During this operation, a magnetic energy is stored in the coil L1. The magnetic energy is released as a flywheel current from the coil L1 from when the switch G3 turns off to when the switch G2 of the IGBT circuit 7a turns on (timing t5 to timing t6, timing t9 to timing t10), which charges the capacitors C1 and C2.

In other words, switching of the switch G2 of the IGBT circuit 7a from the off-state to the on-state or switching of the switch G3 of the IGBT circuit 7b from the off-state to the on-state alternately charges the capacitors C1 and C2 from the fuel cell 4 as well as the flywheel currents caused by the magnetic energy stored in the coil L1 is charged in the capacitors C1 and C2, which provides the step up operation. Thus, the voltage of the fuel cell 4 (an input voltage of the multiple input/output power converter 1) is stepped up to the voltage for the motor inverter 2 (output voltage of the multiple input/output power converter 1).

The above operation is provided for stepping up the fuel cell voltage to the voltage for the motor inverter 2 (motor inverter voltage) with the step up and down DC-DC converter A. On the other hand, this stepping up operation is applicable to stepping up the voltage of the battery 6 to the voltage for the motor inverter 2 with the step up and down DC-DC converter B. In the above operation of the step up and down DC-DC converter A, when a duty ratio of on-periods of the switches G2 and G3 is equal to or more than 50%, a stepping up ratio between the output voltage of the fuel cell and the voltage for the motor inverter 2 is twice or more.

FIGS. 3A and 3B show currents during the above operation in the multiple input/output power converter 1. In FIGS. 3A and 3B, currents of the fuel cell 4 is represented by a broken line I1 (the charge current of the capacitor C2), I2 (the flywheel current of the coil L1) and I3 (the charge current of the capacitor C1, and a current to the motor inverter 2 is represented by a broken line I4.

The current represented by the broken line I1 in FIG. 3A flows from the positive terminal side of the input/output circuit 3b to the switch G2 of the IGBT circuit 7a for the on-period of the switch G2 of the IGBT circuit 7a (from timing t2 to timing t3, from timing t6 to timing t7) and is charged in the capacitor C2 through the switch G2 of the IGBT circuit 7a.

The broken line I2 in FIG. 3B shows a current which flows from the positive terminal side of the input/output circuit 3b through the coil L1 to the flywheel diode D1 of the IGBT circuit 7a and flows through this flywheel diode D1 of the IGBT circuit 7a to the capacitors C1 and C2 to be stored simultaneously while the switch G2 of the IGBT circuit 7a is in the off-period and the switch G3 of the IGBT circuit 7b is in the off-period (from timing t3 to timing t4 and from timing t7 to timing t8).

A broken line I3 in FIG. 3B shows a charge current of the capacitor C1 which flows from the positive terminal side of the input/output circuit 3b through the coil L1 to the flywheel diode D1 of the IGBT circuit 7a and flows through to the flywheel diode D1 of the IGBT circuit 7a to the capacitor C1 for the on-period of the switch G3 of the IGBT circuit 7b (from timing t4 to t5 and from timing t8 to t9), which charges the current in the capacitor C1.

The broken line i4 shown in FIG. 3A shows a current caused by the stored charges in the capacitors C1 and C2 flowing into the motor inverter 2. FIG. 4A shows current and voltage waveforms actually measured in the circuit diagram of the multiple input/output power converter 1. A measured waveform a1 in FIG. 4A shows a waveform of a voltage applied between both terminals of the switch G2. A measured waveform a2 shows a waveform of a current flowing through the positive terminal side of the input/output circuit 3b. A measured waveform a3 in FIG. 4A shows a waveform of a voltage applied between both terminals of the switch G2, and a measured waveform a4 shows a waveform of a current flowing through a line connecting the switch G1 and the capacitor C1.

In FIG. 4B, a reference of "V1" represents the fuel cell voltage, a reference of "V2" represents the motor inverter voltage, and the references "a1", "a2", "a3", and "a4" are indicated in the circuit diagram as measured points. From these measured waveforms, it is confirmed that the voltage of the fuel cell 4 is stepped up.

<Operation II>

Stepping Down Motor Inverter Voltage (Regeneration)

With reference to FIGS. 5A to 7B will be described an operation of stepping down the voltage of the motor inverter 2 to the voltage of the battery (regeneration).

During the operation of stepping down the voltage of the motor inverter 2 to the voltage of the battery 6, the IGBT circuit 7a, the IGBT circuit 7b, the switch G6 of the IGBT circuit 7c, and the switch G7 of the IGBT circuit 7d are always turned off. In this case, the flywheel diode D6 of the IGBT circuit 7c and the flywheel diode D7 of the IGBT circuit 7d serve to allow forward currents to flow therethrough. This operation is provided for a low stepping down rate (0.5 to 1) (a regeneration load is small).

Figure 7A:
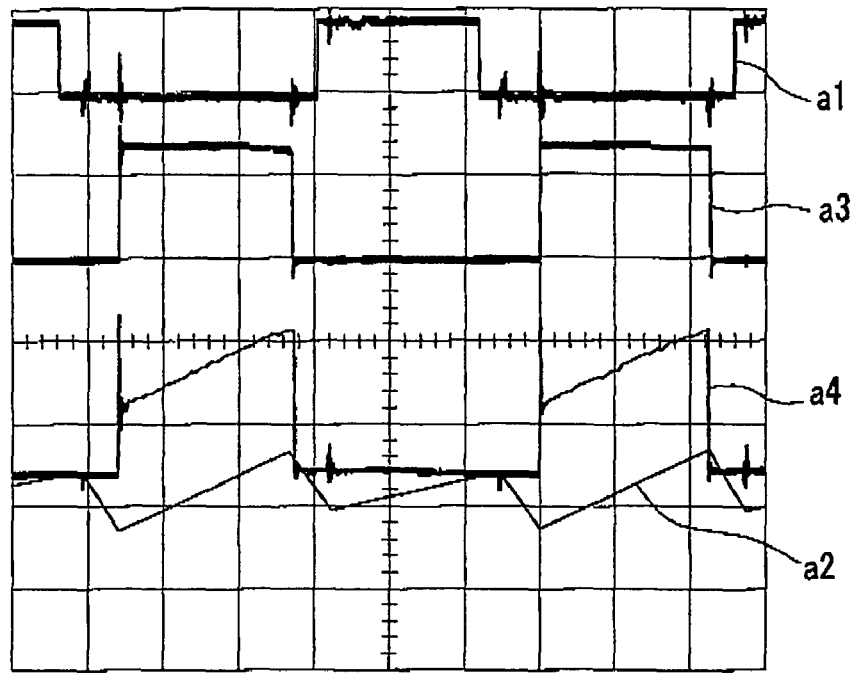
FIGS. 7A and 7B show measured waveforms and measured locations in the stepping down operation of the multiple input/output power converter shown in FIG. 1.
Figure 7B:
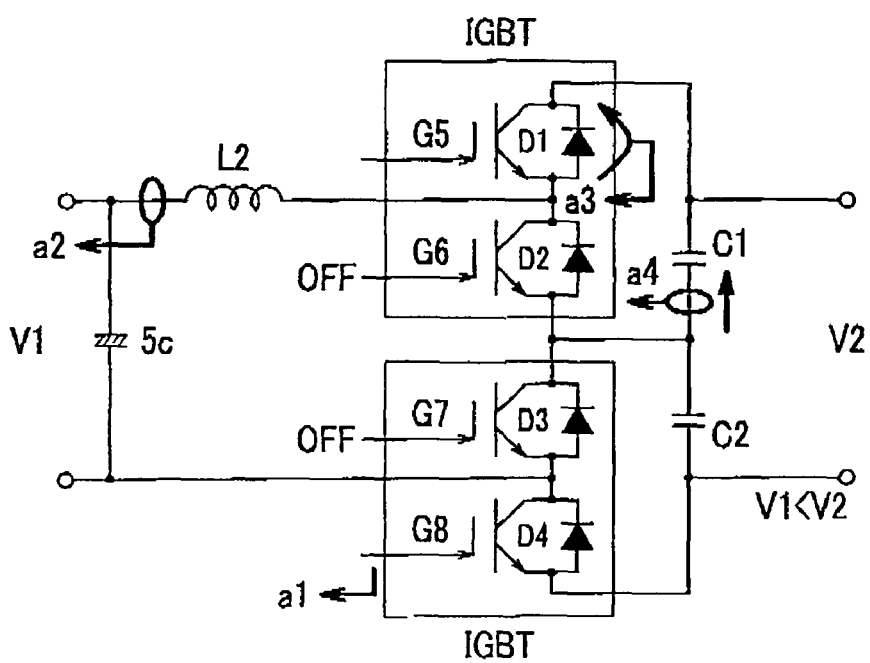

FIGS. 5A to 5F show gate voltage waveforms of the switch G5 of the IGBT circuit 7c and the switch G5 of the IGBT circuit 7d, current waveforms of the capacitors C1 and C2 and the coil L2. FIG. 6A shows currents in the circuit diagram of the multiple input/output power converter 1 when the switch G5 turns off from on-states of the switches G5 and G8. FIG. 6B shows currents in the circuit diagram of the multiple input/output power converter 1 when the switch G5 turns off from a status that the switches G5 and G8 in the on-states. FIG. 7A shows voltage and current waveforms measured in the multiple input/output power converter 1. FIG. 7B shows locations where the waveforms of currents and voltages are measured shown in FIG. 7A.

As shown in FIGS. 5A to 5F, one cycle of a gate voltage of the switch G5 of the IGBT circuit 7c is from timing t1 to timing t5, and one cycle of a gate voltage of the switch G5 of the IGBT circuit 7d is from timing t3 to timing t7. These gate voltage waveforms show on-states of both the switches G5 of the IGBT circuit 7c and the switch G8 of the IGBT circuit 7d for periods from timing t1 to timing t2, timing t3 to timing t4, timing t5 to timing t6, timing t7 to timing t8, and timing t9 to timing t10 (both-on-periods).

For periods from timing t2 to timing t3 and timing t6 to timing t7, only the switch G5 of the IGBT circuit 7c is in an on-state. For periods from timing t4 to timing t5 and timing t8 to timing t9, only the switch C8 of the IGBT circuit 7c is in an on-state. As described above, while the switch G5 the IGBT circuit 7c and the switch G8 of the IGBT circuit 7d alternately turn on and off, the control circuit 11 generates the gate voltages including the both-on-periods.

For the both-on-periods both the switch G5 of the IGBT circuit 7c and the switch G8 of the IGBT circuit 7d simultaneously turn on. Thus, a serial discharging of the capacitors C1 and C2 charged by the motor inverter 2 allows a large current to flow through the coil L2. Thus the coil L2 allows the flywheel current to flow for periods following the both-on-periods without intermission.

For periods from timing t2 to timing t3 and timing t6 to timing t7 only the switch G5 of the IGBT circuit 7c is in the on-state in the gate voltage waveforms (the switch G8 of the IGBT circuit 7d is in an off-state and the capacitor C1 is in a discharging period). During this, the flywheel diode D7 of the IGBT circuit 7d conducts and charges a flywheel current caused by the magnetic energy stored in the coil L2 in the capacitor 5c as well as charges the battery 6. Further, at both ends of the coil L2 a flywheel voltage is developed when the switch G8 turns off to release the magnetic energy stored in the coil L2 and provides a voltage difference between the battery 6 and the capacitor C1 and keeps the flywheel current to flow into the battery 6.

For periods from timing t4 to timing t5 and timing t8 to timing t10 only the switch G8 of the IGBT circuit 7c is in the on-state in the gate voltage waveforms (the switch G5 of the IGBT circuit 7c is in the off-state and the capacitor C2 discharges), and the flywheel diode D6 of the IGBT circuit 7c is in a conducting state (see I7 in FIG. 6B). During this, the flywheel diode D7 of the IGBT circuit 7d conducts and charges the flywheel current caused by the magnetic energy stored in the coil L2 in the capacitor 5c as well as charges the battery 6. Further, at both ends of the coil L2 a flywheel voltage is developed when the switch G5 turns off to release the magnetic energy stored in the coil L2 and provides a voltage difference between the battery 6 and the capacitor C2 and keeps the flywheel current to flow into the battery 6.

FIG. 7A shows voltage and current waveforms actually measured in the above operation.

A measured waveform a1 shows a gate voltage of the switch G8, and a measured waveform a2 shows a current flowing on the positive terminal side of the input/output circuit 3c.

A measured waveform a3 shows a voltage between both terminals of the switch G5, and a measured waveform a4 shows a current flowing through a junction between the capacitors C1 and C2.

<Operation III>

Stepping Up FC Voltage, Stepping Down Motor INV Voltage, and Charging Battery

With reference to FIGS. 8A to 8K and 9A and 9B will be described operations of stepping up the fuel cell voltage to a motor inverter voltage, and stepping down the motor inverter voltage to charge the battery 6.

In the operations of stepping up the fuel cell voltage to the motor inverter voltage, stepping down the motor inverter voltage to charge the battery 6, the switch G1 of the IGBT circuit 7a, the switch G4 of the IGBT circuit 7b, the switch G6 of the IGBT circuit 7c, and the switch G7 of the IGBT circuit 7d are always in off-states.

FIGS. 8A to 8K show waveforms of the gate voltages of the switch G2 of the IGBT circuit 7a, the switch G3 of the IGBT circuit 7b, the switch G5 of the IGBT circuit 7c, the switch G8 of the IGBT circuit 7d, a charge current of the capacitor C2 in the step up and down DC-DC converter A, a flywheel current of the coil L1, a charge current of the capacitors C1, the discharge current of the Capacitors C1 and C2 in the step up and down DC-DC converter B, a discharge current of the capacitor C1, and a discharge current of the capacitor C2

Figure 9A:
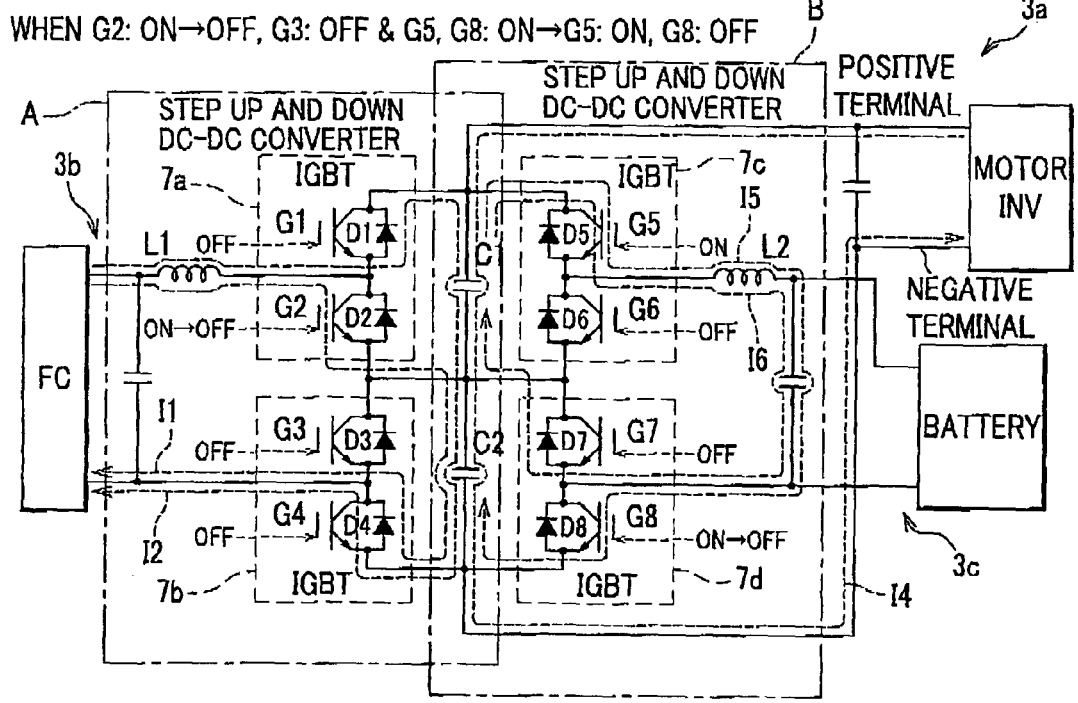
FIGS. 9A and 9B show currents flowing in the multiple input/output power converter shown in FIG. 1 in the stepping up and down operation.
Figure 9B:
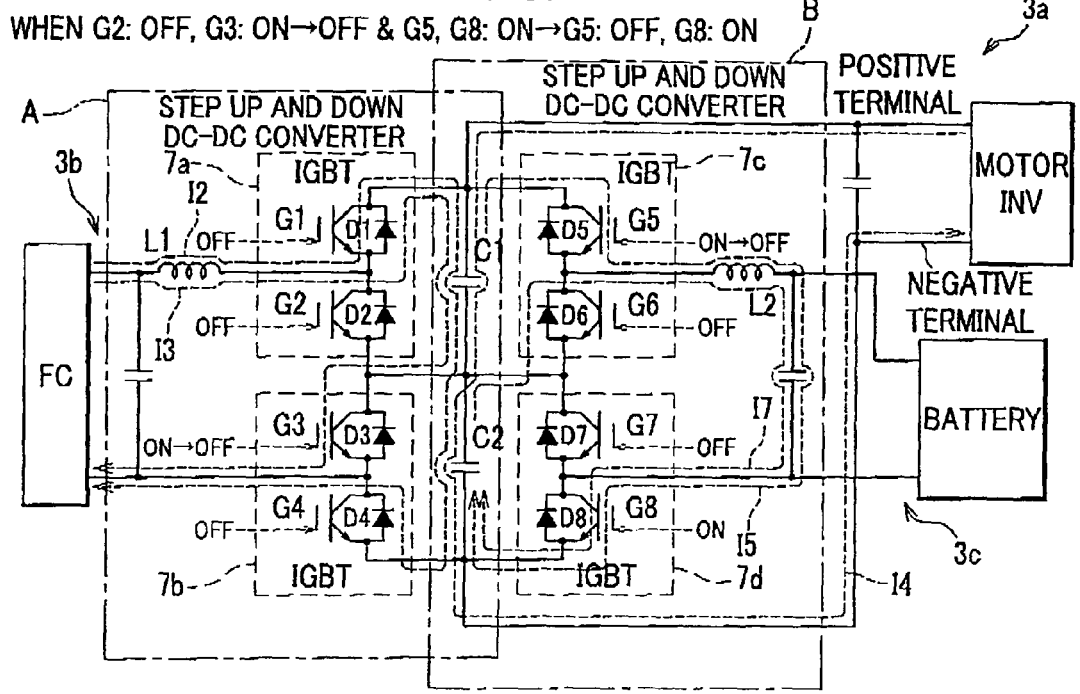

FIG. 9A shows a current in the circuit diagram of the multiple input/output power converter 1 when the switch C2 turns off in the off-state of the switches G3 and a current when the switch G8 turns off from on-states of the switches G5 and G8. FIG. 9B shows in the circuit diagram of the multiple input/output power converter 1 a current when the switch G3 turns off in the off-state of the switches G2 and a current when the switch G5 turns off from the on-states of the switches G5 and G8.

As shown in FIGS. 8A to 8K, one cycle of the gate voltage of the switch G2 of the IGBT circuit 7a is from timing t2 to timing t10, one cycle of the gate voltage of the switch G3 of the IGBT circuit 7b is from timing t6 to timing t14, one cycle of the gate voltage of the switch G5 of the IGBT circuit 7c is from timing t3 to timing t11, and one cycle of the gate voltage of the switch G8 of the IGBT circuit 7d is from timing t7 to timing t15.

From when the switch G2 of the IGBT circuit 7a turns off to when the switch G2 of the IGBT circuit 7a turns on (timing t2 to timing t5 and timing t10 to timing t13), the charge current of the capacitor C2 in the step up and down DC-DC converter A is observed. During this a magnetic energy is stored in the coil L1. From when the switch G2 of the IGBT circuit 7a turns off to when the switch G3 of the IGBT circuit 7a turns on (timing t5 to timing t6 and timing t13 to timing t14), the flywheel current from the coil L1 is observed and charges the capacitors C1 and C2.

From when the switch G3 of the IGBT circuit 7b turns off to when the switch G3 of the IGBT circuit 7a turns on (to timing t1, from timing t6 to timing t9, and from timing t14 to timing t17), the charge current of the capacitor C1 in the step up and down DC-DC converter A is observed. During this the magnetic energy is stored in the coil L1. From when the switch G3 of the IGBT circuit 7a turns off to when the switch G3 of the IGBT circuit 7a turns on (from timing t1 to timing t2, from timing t9 to timing t10, and from timing t17 to timing t18), the flywheel current from the coil L1 is observed and charges the capacitors C1 and C2.

In other words, turning off of the switch G2 of the IGBT circuit 7a or turning off of the switch G3 of the IGBT circuit 7b alternately charges the capacitors C1 and C2 as well as generates the flywheel current caused by the magnetic energy stored in the coil L1 during the charging of the capacitors C1 and C2, which provides a stepping up operation, so that the fuel cell voltage (input voltage) is stepped up to the motor inverter voltage (output voltage). In other words, alternately switching the switch G2 of the IGBT circuit 7a and the switch G3 of the IGBT circuit 7b charges the capacitors C1 and C2 as well as the flywheel current of the coil L1 charges the capacitors C1 and C2, which provides the stepping up operation without intermission.

The discharge current is observed from the capacitors C1 and C2 in the step up and down DC-DC converter B while both the switch G5 of the IGBT circuit 7c and the switch G8 of the IGBT circuit 7d turn on (both-on-period: from timing t3 to timing t4, timing t7 to timing t8, from timing t11 to timing t12, and from timing t15 to timing t16).

During this, the coil L2 stores a magnetic energy, and when the switch G5 turns off (timing t8 and timing t16), a discharge current from the capacitor C2 of the step up and down DC-DC converter B is observed. Further, when the switch G8 of IGBT circuit 7d turns off (timing t4 and timing t12), the discharge current from the capacitor C1 of the step up and down DC-DC converter B is observed.

Thus, the discharge currents (regeneration power) of the capacitors C1 and C2 are returned to the battery 6 and thus voltages of the capacitors C1 and C2 decrease. More specifically, the motor inverter voltage (input voltage) is stepped down to the battery voltage (output voltage).

A broken line I1 in FIG. 9A shows a charge current of the capacitor C2 flowing from the positive terminal side of the input/output circuit 3b to the switch G2 of the IGBT circuit 7a through the coil L1 and stored in the capacitor C2 via the switch G2 in the off-state of the switch G2 of the IGBT circuit 7a (from timing t2 to timing t5 and from timing t10 to timing t13).

A broken line I2 in FIG. 9A shows the flywheel current of the coil L1 which flows from the positive terminal side of the input/output circuit 3b to the flywheel diode D1 of the IGBT circuit 7a and flows through this flywheel diode D1 of the IGBT circuit 7a to the capacitors C1 and C2 to be stored therein simultaneously while the switch G2 of the IGBT circuit 7a and the switch G3 of the IGBT circuit 7a are in the off-states (from timing t1 to t2, from timing t5 to timing t6, from timing t9 to timing t10, from timing t13 to timing t14, and from timing t17 to timing t18).

A broken line I3 in FIG. 9B shows the charge current of the capacitor C1 which flows from the positive terminal side of the input/output circuit 3b to the flywheel diode D1 of the IGBT circuit 7a and through the flywheel diode D1 to the capacitor C1 to be stored in the capacitor C1 in the on-state of the switch G3 of the IGBT circuit 7b (from timing t6 to timing t9, from timing t14 to timing t17).

A broken line I4 in FIG. 9A shows a current, derived from charges stored in the capacitors C1 and C2, flowing to the motor inverter 2

A broken line I5 in FIG. 9A shows the discharge current of the capacitors C1 and C2 which flows from the capacitor C2 via the switch G5 of the IGBT circuit 7c, the coil L2, the capacitor 5c, the switch G8 of the IGBT circuit 7d to the capacitor C2 in the on-states of the switch G5 of the IGBT circuit 7c and the switch G8 of the IGBT circuit 7d (from timing t3 to timing t4, from timing t7 to timing t8, from timing t11 to timing t12, and from timing t15 to timing t16).

A broken line I6 in FIG. 9A shows a discharge current of the capacitor C1 which flows from the positive terminal of the capacitor C1 to the negative terminal side of the capacitor C1 via the switch G5 of the IGBT circuit 7c, the coil L2, the capacitor 5c, the flywheel diode D7 of the IGBT circuit 7d from when the switch G8 of the IGBT circuit 7d turns off to when the switch G8 turns on again in the on-state of the switch G5 of the IGBT circuit 7c.

A broken line I7 in FIG. 9A shows a discharge current of the capacitor C2 which flows from the positive terminal side of the capacitor C2 to the negative terminal side of the capacitor C2 via the flywheel diode D6, the coil L2, the capacitor 5c, the switch G8 of the IGBT circuit 7d from when the switch G8 of the IGBT circuit 7d turns off to when the switch G5 turns on again in the on-state of the switch G5 of the IGBT circuit 7c and the switch G8 of the IGBT circuit 7d.

<Operation IV>

Stepping up FC Voltage and Battery Voltage

With reference to FIGS. 10A to 10L and FIGS. 11A and 11B will be described operations of stepping up the fuel cell voltage to the motor inverter voltage and stepping up the battery voltage.

In the operations of stepping up the fuel cell voltage to the motor inverter voltage and stepping up the battery voltage, the switch G1 of the IGBT circuit 7a, the switch G4 of the IGBT circuit 7b, the switch G5 of the IGBT circuit 7c, and the switch G8 of the IGBT circuit 7d are always in off-states.

FIGS. 10A to 10L show waveforms of the gate voltages of the switch G2 of the IGBT circuit 7a, the switch G3 of the IGBT circuit 7b, the switch G6 of the IGBT circuit 7c, the switch C7 of the IGBT circuit 7d, the charge current of the capacitor C2 of the step up and down DC-DC converter A, the flywheel current of the coil L1, the charge current of the capacitor C1, the flywheel current of the coil L1, the current of the capacitor C2 of the step up and down DC-DC converter B, the flywheel current of the coil L2, the charge current of the capacitor C1, the flywheel current of the coil L2.

FIG. 11A shows in the circuit diagram of the multiple input/output power converter 1 a current measured when the switch G2 turns off in the off-state of the switch G3 and a current measured when the switch G6 turns off in an off-state of the switch G7.

FIG. 11B shows in the circuit diagram of the multiple input/output power converter 1 a current measured when the switch G3 turns off in the off-state of the switch G2 and a current measured when the switch G7 turns off in an off-state of the switch G6.

As shown in FIGS. 10A to 10L, one cycle of the gate voltage of the switch G2 of the IGBT circuit 7a is from timing t3 to timing t11, one cycle of the gate voltage of the switch G6 of the IGBT circuit 7c is from timing t6 to timing t14, and one cycle of the gate voltage of the switch G7 of the IGBT circuit 7d is from timing t3 to timing t11.

A charging current of the capacitor C2 of the step up and down DC-DC converter A is observed for the period from when the switch G2 of the IGBT circuit 7a turns on to when the switch G2 of the IGBT circuit 7a turns off (from timing t3 to timing t6, and timing t11 to timing t14). During this, a magnetic energy is stored in the coil L1, and the flywheel current is observed from the coil L1 from when the switch G2 of the IGBT circuit 7b turns on to when the switch G3 of the IGBT circuit 7b turns on (timing from t6 to timing t7 and from timing t14 to timing t15). This charges the capacitors C1 and C2.

A charge current in the capacitor C1 of the step up and down DC-DC converter A is observed from when the switch G3 of the IGBT circuit 7b turns on to when the switch G3 of the IGBT circuit 7b turns off (from timing t7 to timing t10 and from timing t15 to timing t18). During this, a magnetic energy is stored in the coil L1. Thus, the flywheel current from the coil L1 is observed from when the switch G3 of the IGBT circuit 7b turns off to when the switch G2 of the IGBT circuit 7a turns on (from timing t2 to timing t3, timing t10 to timing t11, and from timing t18 to timing t19). This charges the capacitors C1 and C2.

More specifically, switching the switch G2 of the IGBT circuit 7a from the off-state to the on-state, or switching the switch G3 of the IGBT circuit 7b from the off-state to the on-state alternately charges the capacitors C1 and C2 by the fuel cell 4 as well as the flywheel current caused from the magnetic energy in the coil L1 charges the capacitor C1 and C2. This steps up the fuel cell voltage (input voltage) to the motor inverter voltage (output voltage).

Similarly, a charge current in the capacitor C2 of the step up and down DC-DC converter B is observed from when the switch G6 of the IGBT circuit 7c turns on to when the switch G6 of the IGBT circuit 7c turns off (from timing t6 to timing t9 and from timing t14 to timing t17). During this, the magnetic energy is stored in the coil L2. Thus, a flywheel current from the coil L2 is observed from when the switch G6 of the IGBT circuit 7c turns off to when the switch G7 of the IGBT circuit 7d turns on (from timing t9 to timing t10 and from timing t17 to timing t18). This charges the capacitors C1 and C2.

Further, the charge current in the capacitor C1 of the step up and down DC-DC converter B is observed from when the switch G7 of the IGBT circuit 7d turns on to when the switch G7 of the IGBT circuit 7d turns off (from timing t2 to timing t5 and from timing t10 to timing t13). During this, a magnetic energy is stored in the coil L2. Thus, a flywheel current from the coil L2 is observed from when the switch G7 of the IGBT circuit 7d turns off to when the switch G6 of the IGBT circuit 7c turns on (from timing t5 to timing t6 and from timing t13 to timing t14). This charges the capacitors C1 and C2.

More specifically, switching the switch G6 of the IGBT circuit 7c from the off-state to the on-state, or switching the switch G7 of the IGBT circuit 7d from the off-state to the on-state alternately charges the capacitors C1 and C2 by the fuel cell 4 as well as the flywheel current caused from the magnetic energy in the coil L2 charges the capacitor C1 and C2. This steps up the battery voltage (input voltage) to the motor inverter voltage (output voltage).

A broken line I1 in FIG. 11A shows a charge current of the capacitor C2 which flows from the positive terminal side of the input/output circuit 3b to the switch G2 of the IGBT circuit 7a through the coil L1 and stored in the capacitor C2 via the switch C2 in the on-state of the switch G2 of the IGBT circuit 7a (from timing t3 to timing t6 and from timing t11 to timing t14).

A broken line I2 in FIG. 11A shows a flywheel current of the coil L1 which flows from the positive terminal side of the input/output circuit 3b to the flywheel diode D1 of the IGBT circuit 7a and flows through this flywheel diode D1 of the IGBT circuit 7a to the capacitors C1 and C2 to be stored therein simultaneously in the off-states of the switch G2 of the IGBT circuit 7a and the switch G3 of the IGBT circuit 7b (from timing t2 to timing t3, from timing t6 to timing t7, from timing t10 to timing t11, from timing t14 to timing t15, and from timing t18 to timing t19).

A broken line I3 in FIG. 11B shows a charge current of the capacitor C1 which flows from the positive terminal side of the input/output circuit 3b to the flywheel diode D1 of the IGBT circuit 7a and through the flywheel diode D1 to the capacitor C1 to be stored in the capacitor C1 in the on-state of the switch G3 of the IGBT circuit 7b (to timing t2, from timing t7 to timing t10, and timing t15 to timing t18).

A broken line I4 in FIG. 11A shows a motor inverter current (AC), derived from charges stored in the capacitors C1 and C2, flowing from the positive terminal side of the input/output circuit 3a to the negative terminal side of the input/output circuit 3a.

A broken line I4 in FIG. 11B shows a motor inverter current (AC) flowing from the negative terminal side of the input/output circuit 3a to the positive terminal side of the input/output circuit 3a via the capacitors C2 and C1

A broken line I8 shows a charge current of the capacitor C2 which flows from the positive terminal side of the input/ output circuit 3c to the switch G6 of the IGBT circuit 7c and flows through this switch G6 of the IGBT circuit 7c to the capacitor C2 to be stored therein in the on-state of the switch G6 of the IGBT circuit 7c (from timing t6 to timing t9 and timing t14 to timing t17) and stored in the capacitor C2 via the switch G6 of the IGBT circuit 7c.

A broken line I9 in FIG. 11A shows a flywheel current of the coil L1 which flows from the positive terminal side of the input/output circuit 3c to the flywheel diode D5 of the IGBT circuit 7c and flows through this flywheel diode D5 of the IGBT circuit 7c to the capacitors C1 and C2 to be stored therein simultaneously in the off-states of the switch G6 of the IGBT circuit 7c and the switch G7 of the IGBT circuit 7d (from timing t5 to timing t6, from timing t9 to timing t10, from timing t13 to timing t14, and from timing t17 to timing t18).

A broken line I10 in FIG. 11B shows a charge current of the capacitor C1 which flows from the positive terminal side of the input/output circuit 3c to the flywheel diode D5 of the IGBT circuit 7c through the coil L2 and flows through this flywheel diode D5 of the IGBT circuit 7c to the capacitor C1 to be stored therein in the off-state of the switch G7 of the IGBT circuit 7d (from timing t2 to timing t5, from timing t10 to timing t13, and from timing t18 to and after timing t19).

In the operation shown in FIGS. 11A and 11B, because the step up and down DC-DC converters A and B are operated at different timing and periods, the currents I1, I2, I8, and I9, and the currents I3, I9, and I10 do not flow simultaneously. This reduces loads on the capacitors C1 and C2 and capacities of the capacitors C1 and C2.

<Operation V>

Conducting

The multiple input/output power converter 1 operates as a general rectifier (conducting circuit: a stepping up circuit with a step up rate of one) by setting the multiple input/output power converter 1 in a state that all switches G1 to G4 of the IGBT circuit 7a and IGBT circuit 7b are always in the off-states (stop-state) and all switches G5 to G8 of the IGBT circuit 7c and IGBT circuit 7d are always in the on-states G5 to G8 (or all switches G1 to G4 of the IGBT circuit 7a and IGBT circuit 7b are always in the on-states and all switches G5 to G8 of the IGBT circuit 7c and IGBT circuit 7d are always in the off-states G5 to G8 (stop-state).

In this state, a current flows from the positive terminal side of the input/output circuit 3b to the input/output circuit 3c via the coil L1, the flywheel diode D1 of the IGBT circuit 7a, the switch G5 of the IGBT circuit 7c, and the coil L2, and a current flows from the negative terminal side of the input/output circuit 3c to the negative terminal side of the input/output circuit 3b via the switch G8 of the IGBT 7d, and the flywheel diode D4 of the IGBT circuit 7b, wherein the capacitors C1 and C2 do not contribute these operations (stepping up and stepping down operation).

<Modification>

Figure 12:
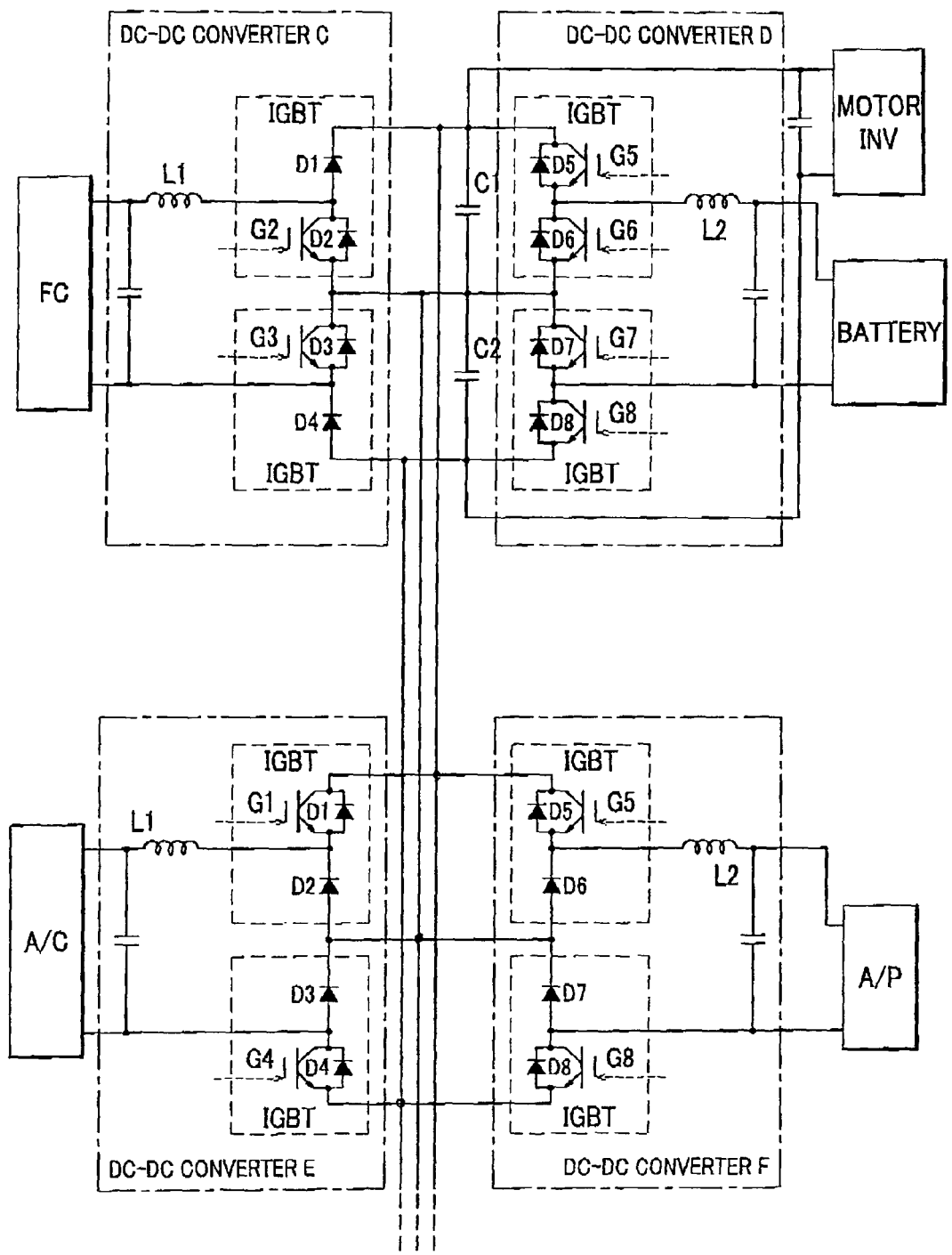
FIG. 12 is a schematic circuit diagram showing a modification of a multiple input/output power converting system including a multiple input/output power converter according to the present invention.

FIG. 12 shows a modification of the multiple input/output power converter 1.

In the modification of the multiple input/output power converter 1, the serially connected capacitors C1 and C2 which are shared between the DC-DC converters C and D are further shared by another pair of DC-DC converters E and F to omit capacitors (not shown) which were originally provided in the DC-DC converters E and F.

The DC-DC converter C, in which the switches G1 and G4 are omitted, provides only the stepping up operation. On the other hand, the DC-DC converter D provides only the stepping up and down operation. Further, the DC-DC converters E and F provide only the stepping down operation. For example, the DC-DC converters E and F provide only the stepping down operation for air conditioner (A/C) and an auxiliary unit (A/P).

As described above, in the modification of the multiple input/output power converter 1, a plurality of power converting circuits, i.e., the DC-DC converters C, D, E, and F, share the serially connected capacitors C1 and C2, which miniaturizes the whole of unit including these DC-DC converts C, D, E, and F, which provides power control for more units.

The present invention is not limited to this modification, but further provide a power converting operation connectable to a plurality of power sources such as a solar cell system, which may serve to miniaturize the system. In this case, the capacities of the shared capacitors are appropriately set in accordance with a capacity or the number of the solar cell.

The present invention is not limited to the above described embodiments. For example, if a load having only one of the stepping up and the stepping down operations is connected, the switches not relating to the stepping up operation or the stepping down operation may be always stopped. However, such the switches can be omitted. It is desired that if the multiple input/output power converter includes a plurality of power converting circuits (the step up and down DC-DC converters A and B, and the DC-DC converters C, D, E, and F), each stepping up and down operation is made at different period regarding the shared capacitors C1 and C2. However, if a stepping up rate of a stepping up operation is more than twice voltage and a stepping down rate of a stepping down operation is from 0.5 to 1, it is possible to provide a period for which the switches of more than one power converters are turned on or off simultaneously.

Switching at different timing or period is provided to reduce loads on the shared series capacitors C1 and C2. More specifically, switching at different timing or period is provided to reduce loads on the shared series capacitors C1 and C2, so that capacities of the capacitors C1 and C2 can be reduced.

Further, the multiple input/output power converter 1 can be mounted on a fuel cell vehicle 100 as shown in FIG. 13. In this case, because driving and regeneration among the fuel cell, the motor, and the battery are frequently switched, the multiple input/output power converter 1 provides a power converting system with low loss.

The invention claimed is:

1. A multiple input-output power converter comprising:
at least two input-output circuits to be connected to electric units;
a plurality of power converting circuits, each of the plurality of power converting circuits including switches, at least an inductor, and a plurality of capacitors; and
a control circuit controlling switching of the switches in a plurality of operation modes to selectively use the inductor and the capacitors to operate the power converting circuits in one of a voltage stepping up operation, a voltage stepping down operation, or a conducting operation, wherein the capacitors comprise a first capacitor and a second capacitor connected in series, the connected first and second capacitors being shared among the plurality of power converting circuits as elements of the plurality of the power converting circuits, wherein
at least one of the power converting circuits comprises a step up and down converting circuit;
the input-output circuits comprise first and second input-output circuits;

the switches comprise:
a first switch selectively connecting a positive terminal of the first input-output circuit to a positive terminal of the first capacitor and a positive terminal of the second input-output circuit;
a second switch selectively connecting the positive terminal of the first input-output circuit to a negative terminal of the first capacitor and a positive terminal of the second capacitor;
a third switch selectively connecting a negative terminal of the first input-output circuit to the negative terminal of the first capacitor and the positive terminal of the second capacitor; and
a fourth switch selectively connecting the negative terminal of the first input-output circuit to a negative terminal of the second capacitor and the negative terminal of the second input-output circuit.

2. A multiple input-output power converter comprising:
at least two input-output circuits to be connected to electric units;
a plurality of power converting circuits, each of the plurality of power converting circuits including switches, at least an inductor, and a plurality of capacitors; and
a control circuit controlling switching of the switches in a plurality of operation modes to selectively use the inductor and the capacitors to operate the power converting circuits in one of a voltage stepping up operation, a voltage stepping down operation, or a conducting operation, wherein the capacitors comprise a first capacitor and a second capacitor connected in series, the connected first and second capacitors being shared among the plurality of power converting circuits as elements of the plurality of the power converting circuits, wherein
at least one of the power converting circuits comprises a step up circuit;
the input-output circuits comprise a first input-output circuit and a second input-output circuit;
and
the switches comprise:
a first diode connecting a positive terminal of the first input-output circuit to a positive terminal of the first capacitor and a positive terminal of the second input-output circuit;
a first switch selectively connecting a positive terminal of the first input-output circuit to a negative terminal of the first capacitor and a positive terminal of the second capacitor;
a second switch selectively connecting a negative terminal of the first input-output circuit to the negative terminal of the first capacitor and the positive terminal of the second capacitor; and
a second diode connecting the negative terminal of the first input-output circuit to a negative terminal of the second capacitor and a negative terminal of the second input-output circuit.

3. A multiple input-output power converter comprising:
at least two input-output circuits to be connected to electric units;
a plurality of power converting circuits, each of the plurality of power converting circuits including switches, at least an inductor, and a plurality of capacitors; and
a control circuit controlling switching of the switches in a plurality of operation modes to selectively use the inductor and the capacitors to operate the power converting circuits in one of a voltage stepping up operation, a voltage stepping down operation, or a conducting operation, wherein the capacitors comprise a first capacitor and a second capacitor connected in series, the connected first and second capacitors being shared among the plurality of power converting circuits as elements of the plurality of the power converting circuits,
wherein
at least one of the power converting circuits comprises a stepping down circuit;
the input-output circuits comprise first and second input-output circuits;
and
the switches comprise:
a first switch selectively connecting a positive terminal of the first input-output circuit to a positive terminal of the first capacitor, and a positive terminal of the second input-output circuit;
a first diode connecting the positive terminal of the first input-output circuit to a negative terminal of the first capacitor and a positive terminal of the second capacitor;
a second diode connecting a negative terminal of the first input-output circuit to the negative terminal of the first capacitor and a positive terminal of the second capacitor; and
a second switch selectively connecting a negative terminal of the first input-output circuit to a negative terminal of the second capacitor and a negative terminal of the second input-output circuit.

4. A multiple input-output power converter as claimed in claim 1, wherein at least one of the power converting circuits is directly connected to the capacitors in parallel.

5. A multiple input-output power converter as claimed in claim 1, wherein the control circuit controls the switches to operate the power converting circuits at different switching timing, respectively.

6. A fuel cell vehicle comprises:
a fuel cell;
a motor; and
a multiple input-output power converter as claimed in claim 1, the multiple input-output power converter connected to the fuel cell and the motor.

7. The fuel cell vehicle as claimed in claim 6, wherein at least one of the power converting circuits is directly connected to the capacitors in parallel.

8. The fuel cell vehicle as claimed in claim 6, wherein the control circuit controls the switches to operate the power converting circuits at different switching timing, respectively.

9. A multiple input-output power converter as claimed in claim 2, wherein at least one of the power converting circuits is directly connected to the capacitors in parallel.

10. A multiple input-output power converter as claimed in claim 2, wherein the control circuit controls the switches to operate the power converting circuits at different switching timing, respectively.

11. A fuel cell vehicle comprises:
a fuel cell;
a motor; and
a multiple input-output power converter as claimed in claim 2, the multiple input-output power converter connected to the fuel cell and the motor.

12. The fuel cell vehicle as claimed in claim 11, wherein at least one of the power converting circuits is directly connected to the capacitors in parallel.

13. The fuel cell vehicle as claimed in claim 11, wherein the control circuit controls the switches to operate the power converting circuits at different switching timing, respectively.

14. A multiple input-output power converter as claimed in claim 3, wherein at least one of the power converting circuits is directly connected to the capacitors in parallel.

15. A multiple input-output power converter as claimed in claim 3, wherein the control circuit controls the switches to operate the power converting circuits at different switching timing, respectively.

16. A fuel cell vehicle comprises:
   a fuel cell;
   a motor; and
   a multiple input-output power converter as claimed in claim 3, the multiple input-output power converter connected to the fuel cell and the motor.

17. The fuel cell vehicle as claimed in claim 16, wherein at least one of the power converting circuits is directly connected to the capacitors in parallel.

18. The fuel cell vehicle as claimed in claim 16, wherein the control circuit controls the switches to operate the power converting circuits at different switching timing, respectively.

* * * * *